Figure 7:
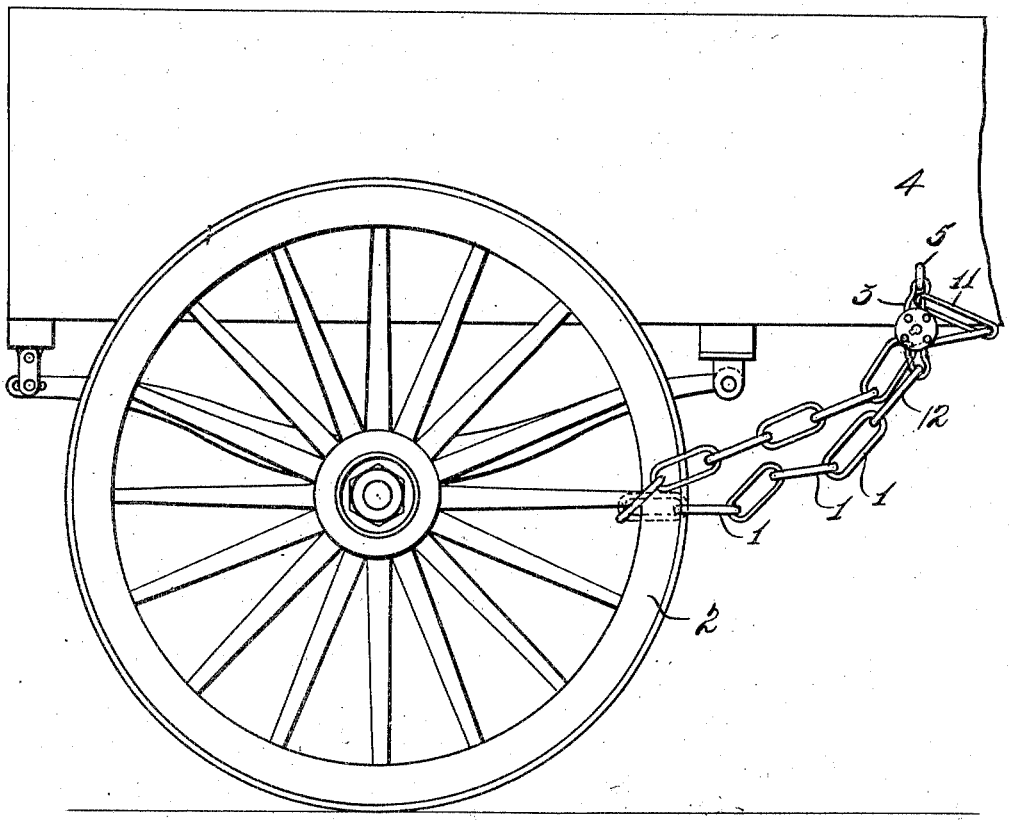

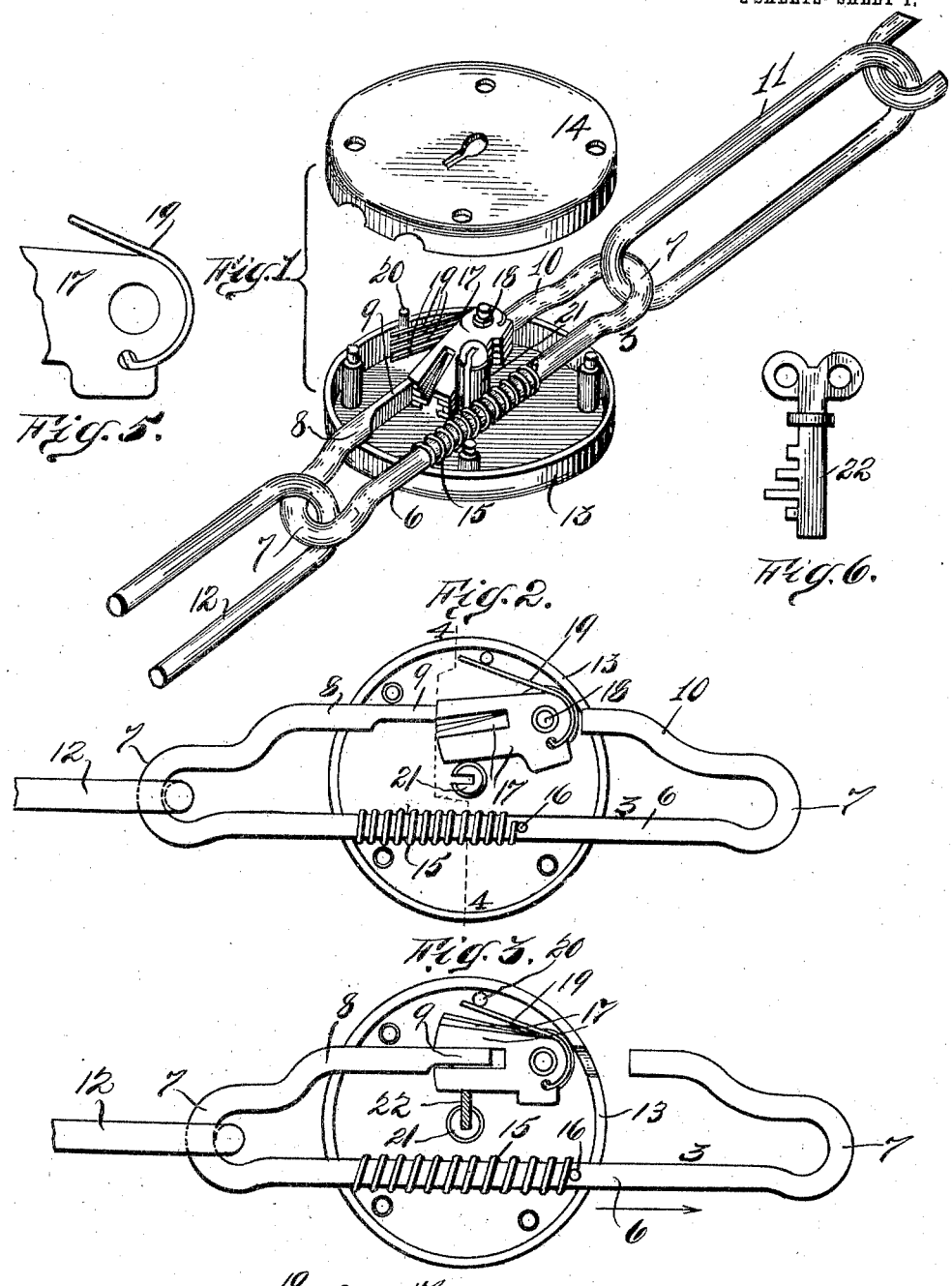

UNITED STATES PATENT OFFICE.

JOHN U. BARR, OF NEW YORK, N. Y.

LOCKING-CHAIN.

967,308. Specification of Letters Patent. Patented Aug. 16, 1910.

Application filed May 22, 1909. Serial No. 497,779.

*To all whom it may concern:*

Be it known that I, JOHN U. BARR, a citizen of the United States, residing at New York city, New York, have invented certain new and useful Improvements in Locking-Chains, of which the following is a clear, full, and exact description.

The object of this invention is to provide a chain for locking a movable part or object to a stationary part or relatively stationary part by means of a chain in such a manner that all stress and strain that may be exerted upon the movable part to move it away from the relatively stationary part, will be taken up entirely by the chain links, and not by the lock mechanism, as is the case at present when ordinary pad locks are used to connect the free ends of chains, when such are used for securing purposes.

My invention is applicable, as will be apparent to a great diversity of uses.

The chaining of a wagon wheel to the wagon body, of an automobile wheel to the chassis, are two apparent uses of the multitude of instances where my invention may be used.

In carrying out my invention I provide a continuous chain of links, preferably of the ordinary chain construction, and I connect the two free end links of this chain with an open link, that is, a link having an opening on one of its sides to permit the free ends of the chain to be hooked to said open link. Consequently a direct pull on the chain will be taken up by the straight unopened side of the open link which is preferably made stronger than the ordinary links of the chain. All strain from the moving part is thus transmitted from the ordinary chain links to the solid side member of the open link. Carried by the open link, and movable thereon I provide a lock provided with means to permit it to be moved into position to cover the opening in the side of the open link. This lock may be of any suitable construction. In the drawings appended hereto, it is shown as an ordinary tumbler lock, in which the tumblers are moved into the path of the open side of the link to prevent the same from being disclosed outside of the lock casing. It will thus be seen that no strain or pull on the link can in any way be transmitted to the lock mechanism to disrupt and tend to destroy the same.

In the accompanying drawings, Figure 1 is a perspective view of a portion of the chain and lock with one side of the casing removed. Fig. 2 is a plan view of the one link, and lock, with the cover of the casing removed. Fig. 3 is a view similar to Fig. 2, but showing the link in open position. Fig. 4 is a cross section on line 4—4 Fig. 2. Fig. 5 is a detail of one end of the tumbler, and its spring. Fig. 6 is a detail side elevation of a key. Fig. 7 is a side elevation of a portion of a wagon, showing my invention in place.

As shown in the drawings, the chain may be composed of a number of ordinary open links 1, which may be passed around a wagon wheel 2, one part of the chain in this case, the open link 3 being secured to the stationary body 4 of the wagon by a screw-eye 5, although any other link of the chain may be secured to the wagon. The open link 3 is provided with one strong straight side 6, terminating in ordinary looped ends 7, which may be given an additional curve outward from the center of the link to aid in securing a line of draft nearly centrally with this side of the link. The other side of the link is composed of two short members with a space between the same. The member 8 is slabbed at its end 9, to fit the opening in certain tumblers to be hereinafter described, while the end 10 is adapted to enter a hole in the lock casing when the device is in a lock position, there being sufficient space between the end of the side 10 and the casing to permit the entrance of a chain link 11. A link 12 is preferably always secured to the opposite end of the open link.

A casing composed of two halves 13 and 14, is provided, which is adapted to be slid up and down the open link. A spring 15 bearing against the inner flange of the casing, and a pin 16 on the side 6, of the open link, tends always to keep the link in position of Fig. 3. Tumblers 17 mounted on a post 18 and provided with lead springs 19 bearing against the stud 20 in the casing, are held by their springs normally in the position of Fig. 2. A key post 21 is provided, that a key 22 may be inserted into the key post to turn the tumblers into the position of Fig. 3, in which case a spring 15 will project the open end 10 of the open link outward into the position of Fig. 3, that one end of a chain may be hooked thereto.

The operation and advantage of this improved device will be apparent from the foregoing description.

I claim as my invention:

The herein described continuous chain composed of a number of closed links and an open link, a lock casing, the open link extending through the lock casing, the lock casing adapted to be moved to cover the opening in said open link, and locked in said position.

Signed at New York city this 13th day of May 1909.

JOHN U. BARR.

Witnesses:
MABEL DITTENHOEFER,
BENJAMIN OKSENKRUG.